United States Patent Office 3,037,847
Patented June 5, 1962

3,037,847
STABILIZED HYDROGEN PEROXIDE
Abe Warshaw, Linden, N.J., assignor to Chemical Construction Corporation, New York, N.Y., a corporation of Delaware
No Drawing. Filed Feb. 29, 1960, Ser. No. 11,409
8 Claims. (Cl. 23—207.5)

This invention relates to the stabilization of hydrogen peroxide against decomposition. More particularly the invention is concerned with the addition of ascorbic acids to hydrogen peroxide solutions to produce a remarkable and highly effective stabilizing action even at elevated temperatures.

The retardation or prevention of hydrogen peroxide decomposition has been the subject of numerous investigations and studies in recent years. An excellent discussion of theoretical decomposition mechanisms and suggested stabilization agents is presented on pages 515–547 in the recent American Chemical Society Monograph No. 128 titled "Hydrogen Peroxide" by W. C. Schumb et al. (1955 edition, Reinhold Publ. Corp.).

From a theoretical viewpoint, it appears that the tendency of absolutely pure hydrogen peroxide to decompose into water and oxygen is negligible. This appears to be true even if the pure material is in aqueous solution, provided that the water of solution is absolutely pure. However, in practice numerous agents or conditions tend to initiate or accelerate decomposition. Thus a very slight trace of dissolved impurity such as ferric or other metallic ions exerts a marked catalytic decomposition effect. It also appears that the surface of the container in which the hydrogen peroxide is placed has a significant influence on decomposition rates. Thus a rough container surface or the presence of minute surface scratches will increase decomposition rates to an extent which will vary in an empirical manner dependent upon individual circumstances. Temperature and pH conditions also influence decomposition tendency to some extent.

Thus in commercial practice it is usually necessary to provide small amounts of an additive or additives to act as stabilizing agents for hydrogen peroxide solutions containing up to 30% to 40% hydrogen peroxide. This is particularly necessary in the case of the more dilute solutions, particularly solutions containing less than 3% hydrogen peroxide, since the decomposition tendency of a dilute aqueous hydrogen peroxide solution is considerably greater than that of a concentrated solution, all other factors being equal.

In numerous commercial processes, large quantities of hydrogen peroxide are utilized in dilute solutions as bleaching agents or for similar purposes. Thus the textile industry alone generally consumes about one-third of all hydrogen peroxide consumed in non-military usage. In textile usage various other additives are usually incorporated in the dilute hydrogen peroxide solution for other purposes relating to the processing of cloth. While it has been indicated that cloth processing additives such as sodium silicate also produce a stabilizing effect in textile bleach solutions, it has been found in numerous instances that decomposition of the hydrogen peroxide in bleach solutions represents a considerable economic loss.

In addition to the use of stabilizing agents, rather specific materials of construction are required for hydrogen peroxide containers. As indicated in Schumb et al. p. 524, cited supra, boro-silicate glass, aluminum, tin, magnesium and certain stainless steels have been found to exert a minimum catalytic effect on the decomposition process. Thus these are the preferred materials of construction for hydrogen peroxide containers. Usually an additional surface conditioning procedure is applied to the container, in order to further reduce its surface decomposition effect.

Among the various stabilizing agents which have been employed in practice may be mentioned sodium stannate, 8-hydroxy quinoline and sodium pyrophosphate. In some cases a combination of two or more agents has been found to provide more effective protection than either one taken separately. Thus by combining agents, a total reduction in decomposition rate is achieved which may be greater than the sum of the individual reductions which result when the agents are used independently. The selection of a combination of this nature is usually determined by mere experimentation, since it is an empirical phenomenon which depends on individual circumstances such as conditions of hydrogen peroxide storage and usage, and type of contamination and nature of contaminant which may be encountered. For certain purposes limitations may be placed upon the choice of an inorganic stabilizer due to the quantity of undesirable residual matter which may be left after a large quantity of the hydrogen peroxide has been decomposed in use. Another important consideration which applies particularly to organic stabilizing agents is the matter of stabilizer unit cost relative to the amount of stabilization achieved. Some organic agents are not acceptable in cases where prolonged storage of the hydrogen peroxide solution prior to use may take place, since under such circumstances slow oxidation may destroy the effectiveness of an organic compound.

In the present invention, it has been found unexpectedly that ascorbic acids are highly effective as stabilizing agents for hydrogen peroxide. The ascorbic acids possess numerous advantages as compared to other additives previously suggested. The ascorbic acids are non-toxic and hence are suitable and advantageous when the hydrogen peroxide is to be utilized for medicinal purposes or in foods. Furthermore, ascorbic acids, particularly the common l-ascorbic acid, are efficient stabilizers for the relatively dilute solutions often encountered in medical practice as well as for more concentrated solutions. Ascorbic acid is quite inexpensive for this purpose, since relatively small amounts are required for effective stabilization. Additionally, ascorbic acid does not leave an undesirable residue as compared to the various inorganic agents previously mentioned. Hydrogen peroxide solutions stabilized with ascorbic acid have been found to retain activity and concentration, with negligible decomposition, over long periods of storage. Surprisingly, it has been further found that small additions of ascorbic acids will stabilize hydrogen peroxide solutions even when the solutions are maintained at temperatures approaching the boiling point of water under normal conditions.

It is an object of the present invention to stabilize hydrogen peroxide solutions against decomposition even at elevated temperatures.

Another object of the present invention is to prevent hydrogen peroxide decomposition by the use of a more effective stabilizing agent.

A further object of the present invention is to provide a stabilizing agent for hydrogen peroxide which will not leave undesirable residual matter in the usage of the hydrogen peroxide.

An additional object of the present invention is to provide an organic stabilizing agent for hydrogen peroxide which will not oxidize or decompose in the presence of hydrogen peroxide over an extended period of time, and is therefore suitable for usage in the storage of hydrogen peroxide.

Still another object of the present invention is to effectively stabilize the more readily decomposed dilute solutions containing up to about 3% hydrogen peroxide, by the use of a stabilizing agent which is effective over the entire range of possible hydrogen peroxide concentrations.

These and other objects and advantages of the present invention will become evident from the description which follows.

The effectiveness of ascorbic acids was tested in most instances using relatively dilute hydrogen peroxide solutions. As previously mentioned, stabilization of dilute solutions is considerably more difficult than the stabilization of concentrated solutions, all other factors being equal.

A preferable range of hydrogen peroxide solution strengths requiring stabilization comprises solutions containing up to about 3% hydrogen peroxide, since most solutions of commercial and medicinal value are utilized as dilute solutions of strengths up to 3%. However, ascorbic acids are also an effective stabilizer for the more concentrated solutions which are commercially manufactured and shipped in standard grades such as up to 30% or 40% solutions. Following are examples showing the remarkable effectiveness of various ascorbic acids as stabilizers.

While the preferred ascorbic acid to be used as a stabilizer for hydrogen peroxide is the more common l-ascorbic acid, other ascorbic acids as d-araboascorbic acid, d-glucoascorbic acid, l-rhamnoascorbic and others could be substituted for the l-ascorbic with very little loss of stabilizing effect as shown below. The main reason for using the l-ascorbic acid with hydrogen peroxide solutions is that, in addition to being somewhat more efficient as a stabilizer, it is more readily available in commerce and as a consequence is cheaper than other ascorbic acids.

*Example I*

A commercial 30% hydrogen perioxide solution was diluted with water to provide an approximately 2 Normal solution (about 3% strength). Two 500 milliliter portions of the 2 N solution were placed in amber glass bottles, and 250 milligrams of ascorbic acid was added to one portion, thus providing 0.05% ascorbic acid concentration in this solution. The other solution was not treated. The two solutions were then put aside, and the normalities were periodically determined by titrating 2 ml. portions with 0.1 N potassium permanganate. The following results were obtained.

| Time Interval | Hydrogen Peroxide with Ascorbic Acid | Untreated Hydrogen Peroxide |
|---|---|---|
| Original Normality | 1.939 | 1.973 |
| After 48 hours | 1.927 | 1.829 |
| After 1 month | 1.922 | 1.217 |

It is apparent from the above data that after a small initial 48 hour variation, the hydrogen peroxide solution stabilized with ascorbic acid showed practically no decomposition for the one month period. The untreated hydrogen peroxide solution experienced about 34% loss in strength over the same time interval.

*Example II*

A dilute hydrogen peroxide solution of about 0.2 N (0.3% strength) was employed as a laboratory volumetric standard. Due to the fact that untreated solution decomposed at the rate of about 2% every 24 hours, the solution had to be standardized before each titration. Various known commercial stabilizers had been ineffective in controlling this decomposition, or even in modifying the decomposition rate. Approximately 0.2 N solution was then prepared containing 0.02% ascorbic acid. This soltuion was employed over a three-month period at ambient temperatures which varied between 70° F. and 90° F. The original solution normality was 0.191 N, and after the three month period the remaining solution retained a normality of 0.187 N. This compares quite favorably with many accepted volumetric standards with regard to stability, and in effect provides a new chemical laboratory standard for volumetric oxidation-reduction titrations.

From the above examples it is evident that maximum stabilization of dilute solutions containing up to 3% hydrogen peroxide is attained by the use of less than about 0.1% ascorbic acid concentration in the solutions. It may be seen that the lower limit of ascorbic acid addition will be a function of the degree of stabilization desired for a given solution, while use of over 0.1% ascorbic acid concentrations in dilute solutions would not provide increased stabilization effect to any significant extent. However, the most dilute solution tested, the 0.3% solution of Example II, showed negligible decomposition with addition of only 0.02% ascorbic acid concentration. Thus it appears that even smaller ascorbic acid concentrations, down to 0.01% or less would be effective for the more dilute solutions encountered in specific usages of dilute hydrogen peroxide.

It should be noted that the use of ascorbic acid as a stabilizer can be readily extended to the medical usages of hydrogen peroxide, since ascorbic acid is not harmful to tissues and does not leave any undesirable residues.

*Example III*

In order to determine the stabilizing effect of ascorbic acid on a more concentrated hydrogen peroxide solution under ambient conditions, two 200 milliliters samples were prepared from a commercial hydrogen peroxide solution marked as containing 30% hydrogen peroxide. Ascorbic acid in an amount equal to 0.05% by volume was added to one sample while the other sample was used as a control. Analyses for hydrogen peroxide concentrations were made periodically over approximately a three-week period on both treated and untreated samples. The results obtained are as follows:

| Elapsed Time | Concentrated $H_2O_2$ with 0.05% Ascorbic Acid, Percent by volume | Concentrated $H_2O_2$ without Stabilizer, percent by volume |
|---|---|---|
| original | 38.00 | 38.19 |
| after 4 days | 37.90 | 37.70 |
| after 6 days | 37.90 | 37.26 |
| after 11 days | 37.90 | 36.90 |
| after 13 days | 37.90 | 36.62 |
| after 18 days | 37.90 | 36.27 |

This test shows that a negligible change occurred in the hydrogen peroxide solution stabilized with ascorbic acid during the test run. On the other hand, the untreated solution showed about a 5% decomposition in the same period.

*Example IV*

After having found that ascorbic acid is an excellent stabilizer for both concentrated and dilute hydrogen peroxide solutions, a further test was made to estabilsh whether ascorbic acid would be effective as a stabilizer at higher temperatures. Two 100 milliliter portions of a dilute hydrogen peroxide solution anaylzing 2.15% $H_2O_2$ by volume was transferred to two 250 milliliter Erlenmeyer flasks and 50 milligrams of ascorbic acid was added to one of the flasks. Air condensers were attached to each flask and the flasks were placed in a water bath kept at 80° C. The hydrogen peroxide content in each flask was tested at the end of 1½ hours and again after having been in the water bath 20 hours. The results obtained are set forth in the following table.

| Time in hours, Bath at 70°-80° C. | Percent Hydrogen Peroxide without Ascorbic Acid | Percent Hydrogen Peroxide with Ascorbic Acid |
|---|---|---|
| 1½ | 1.98 | 2.11 |
| 20 | 0.69 | 2.11 |

Example V

A test was also conducted wherein d-araboascorbic acid was substituted as a stabilizer for the l-ascorbic acid employed in the previous tests. This compound was also found to be a very good stabilizer for hydrogen peroxide solutions. As in Examples I–III, two portions of hydrogen peroxide solution were transferred to flasks and 50 milligrams of d-araboascorbic acid were added to one of the flasks. The normality of the hydrogen peroxide solution at the beginning of the test was 1.849 N (3.14 wt. percent). The results are as follows:

| Elapsed Time | Normality of H$_2$O$_2$ solution with d-araboascorbic acid | Normality of H$_2$O$_2$ solution without d-araboascorbic acid |
|---|---|---|
| original | 1.849 | 1.849 |
| after 3 days | 1.845 | 1.724 |
| after 6 days | 1.836 | 1.461 |
| after 10 days | 1.831 | 1.288 |

I claim:

1. A stabilized aqueous hydrogen peroxide solution with a reduced tendency to decompose, comprising in addition to the water up to about 40% hydrogen peroxide and between about 0.01 weight percent to about 0.1 weight percent of an ascorbic acid.

2. The composition according to claim 1 in which the ascorbic acid is selected from the group consisting of l-ascorbic acid and d-araboascorbic acid.

3. In a method of stabilizing the hydrogen peroxide in hydrogen peroxide-containing solutions the improvement which comprises incorporating at least a small but effective amount of an ascorbic acid into the solution.

4. The method of stabilizing hydrogen peroxide against decomposition in an aqueous solution containing up to about 40% hydrogen peroxide which comprises adding at least a small but effective amount of an ascorbic acid into the solution.

5. The method according to claim 4 in which the ascorbic acid is selected from the group consisting of l-ascorbic acid and d-araboascorbic acid.

6. A method of stabilizing a hydrogen peroxide solution containing up to about 40% hydrogen peroxide which comprises adding thereto an ascorbic acid in the amount of between about 0.01 weight percent to about 0.1 weight percent of the total solution.

7. The method according to claim 6 in which the ascorbic acid is selected from the group consisting of l-ascorbic acid and d-araboascorbic acid.

8. A stabilized aqueous hydrogen peroxide solution with reduced tendency to decompose, comprising an aqueous solution of hydrogen peroxide having incorporated therein at least a small but effective amount of ascorbic acid in the said aqueous solution.

References Cited in the file of this patent

FOREIGN PATENTS 731,238     Great Britain  ---------- June 1, 1955

OTHER REFERENCES

Chaberet and Martell: "Organic Sequestering Agents," John Wiley and Sons, Inc., N.Y., 1959, pages 430–431 and 512.